United States Patent Office 2,742,506
Patented Apr. 17, 1956

2,742,506

DECHLORINATION OF OCTACHLOROCYCLO-PENTENE TO HEXACHLOROCYCLOPENTA-DIENE

Aylmer H. Maude and David S. Rosenberg, Niagara Falls, N. Y., assignors to Hooker Electrochemical Company, Niagara Falls, N. Y., a corporation of New York No Drawing. Application February 16, 1953, Serial No. 337,208

16 Claims. (Cl. 260—648)

This invention relates to an improvement in the pyrolytic dechlorination of octachlorocyclopentene to hexachlorocyclopentadiene. More particularly this invention comprises a process for the pyrolytic dechlorination of octachlorocyclopentene at a temperature between about 400 and about 550 degrees centigrade in the presence of a catalytic surface, selected from the group consisting of nickel, cobalt, nickel chloride, cobalt chloride, and mixtures thereof whereby the rapid and substantially complete conversion to hexachlorocyclopentadiene is caused. Still more particularly, this invention includes employing crude mixtures of octachlorocyclopentene containing the product of the reaction as solvent therefor, gaseous hydrogen chloride, gaseous chlorine and organic impurities usually associated therewith as a result of manufacture by thermal methods, as the raw material for this process.

Hexachlorocyclopentadiene is a valuable chemical useful as such and as a chemical raw material in making insecticides, polymers, plastics, etc., and because of its wide utility many methods for preparing the material have been explored.

A method for making hexachlorocyclopentadiene, which is disclosed and claimed in our copending application S. N. 216,651, filed March 20, 1951, now Patent No. 2,650,942, of which this application is a continuation, involves converting polychloropentanes to hexachlorocyclopentadiene.

Among the known methods is the dechlorination of octachlorocyclopentene to hexachlorocyclopentadiene by subjecting octachlorocyclopentene in the presence of carbon tetrachloride to a temperature of about 470 to 480 degrees centigrade; however, this method is depicted in the literature as taking place at a very slow rate. (Krynitsky, JACS 69, 1918–1920 (1947).

We have now found that the rapid and substantially complete pyrolytic dechlorination of octachlorocyclopentene to hexachlorocyclopentadiene can be realized, with or without the presence of a diluent for the octachlorocyclopentene, by effecting the reaction at a temperature between about 400 and about 550 degrees centigrade, in the presence of a catalytic surface selected from the group consisting of nickel, cobalt, nickel chloride, cobalt chloride, and mixtures thereof. We have also found that when employing the product of the reaction as a diluent for the reactant to be dechlorinated that the dechlorination is also rapid and substantially complete when effected in the presence of the catalysts of this invention and that the necessity for separating the product from an unlike solvent is thereby obviated. Still further we have found that by effecting the reaction in the presence of an added gas substantially inert under the conditions of the reaction that the dechlorination of octachlorocyclopentene to hexachlorocyclopentadiene is still further favored. We have found that among the inert gases which may be advantageously employed in accordance with our invention are nitrogen, hydrogen chloride or a mixture of hydrogen chloride containing minor amounts of chlorine. Such gaseous mixtures which are available from a large variety of commercial chlorination processes, particularly those involving chlorination of a hydrocarbon or partially chlorinated hydrocarbon, can be gainfully employed. In addition, we have found that when employing crude mixtures as feed the efficiency of the catalyst employed is decreased with continued use due to a carbonaceous deposit, and that this may be substantially avoided by introducing a small amount of carbon dioxide, oxygen or air into the reaction zone under the conditions of the reaction continuously or intermittently during the reaction.

Preferred embodiments of this invention which exemplify these findings are given in the following examples; however, our invention is not to be construed as limited thereto except as defined in the appended claims.

*Example 1*

One mole of octachlorocyclopentene of about 99 percent purity prepared in accordance with the process described in our copending application S. N. 216,652 filed on March 20, 1951, and purified by distillation was introduced into a ¾ inch nickel pipe 36 inches long containing 212 cubic centimeters of free reactor space maintained at a temperature of about 500 degrees centigrade. The octachlorocyclopentene was melted and then introduced into the hot reaction zone at a liquid feed rate of about 2.0 cubic centimeters per minute whereby a nominal retention time, calculated on the molal feed, in the reaction zone of about 24 seconds was maintained. The crude effluent from the reaction zone was condensed and analyzed 92 percent hexachlorocyclopentadiene and 7 percent octachlorocyclopentene. Thus 93 percent of the octachlorocyclopentene originally introduced was converted to hexachlorocyclopentadiene in one pass with only a 24 second retention time, through the reaction zone.

*Example 2*

One mole of octachlorocyclopentene was mixed with approximately its own volume of hexachlorocyclopentadiene. This mixture, which was liquid, was vaporized with about 12 volumes of hydrogen chloride gas per volume of organic vapor. The hydrogen chloride gas contained about 10 percent of chlorine gas. This gaseous mixture was introduced into a one inch nickel pipe 28 inches long containing 380 cubic centimeters of free reactor space maintained at a temperature of about 500 degrees centigrade. The nominal retention time in the reaction zone was about two seconds. The crude effluent was condensed and analyzed and found to contain less than 4.8 percent unconverted octachlorocyclopentene the balance of the octachlorocyclopentene being completely converted to hexachlorocyclopentadiene. In comparison with Example 1 this shows the advantages of diluting the reactants with an inert gas in accordance with our invention.

*Example 3*

Example 2 was repeated except that the reaction zone was completely filled with small pieces of protruded thin sheet nickel packing leaving 359 cubic centimeters of free reactor space. Under these conditions only 1.7 percent unconverted octachlorocyclopentene was found in the product the balance of the octachloropentene being completely converted to hexachlorocyclopentadiene. In comparison with Example 2 this shows the advantages of increasing the amount of catalytic nickel surface.

*Example 4*

Example 2 was repeated except that the reaction zone was loaded with 380 cubic centimeters of prepared catalyst. The catalyst preparation involved boiling 570 cubic centimeters of 10 to 20 mesh pumice in a saturated solution of cobalt chloride in water, drying the drained solids at a temperature of 170 degrees centigrade and screening the dried catalyst. Under these conditions only 1.3 percent unconverted octachlorocyclopentene was found in the product the balance of the octachlorocyclopentene being completely converted to hexachlorocyclopentadiene.

*Example 5*

Example 4 was repeated using nickel chloride deposited on pumice as a catalyst prepared in the same manner as the cobalt chloride catalyst. Under these conditions only 1.3 percent unconverted octachlorocyclopentene was found in the product the balance of the octachlorocyclopentene being completely converted to hexachlorocyclopentadiene.

*Example 6*

Example 2 was repeated except that the reactor tube was a clean one inch glass pipe submerged in a hot salt bath to maintain a temperature of 500 degrees centigrade and to give a 21 inch heated reaction zone of 287 cubic centimeters free space. The nominal retention time, calculated on the molal feed, in the heated zone was about 2.0 seconds. The crude effluent was condensed and analyzed and found to contain 16.5 mole percent octachlorocyclopentene the balance of the octachlorocyclopentene being completely converted to hexachlorocyclopentadiene. This shows the small conversion in absence of the catalytic surface of this invention with a marked improved performance over the prior art due to the presence of our added gas.

*Example 7*

Example 6 was repeated except that two clean 20 gauge metallic nickel strips ¾ inch wide and 17 inches long were inserted into the glass tube. Under these conditions only 5.0 mole percent octachlorocyclopentene were found in the product the balance of the octachlorocyclopentene being completely converted to hexachlorocyclopentadiene. This again shows the catalytic action of the nickel surface as compared to Example 6.

*Example 8*

A run was made under the same conditions cited in Example 2 employing the same crude raw material. The initial concentration of octachlorocyclopentene in the effluent was found to be 5.1 percent the balance of the octachlorocyclopentene being completely converted to hexachlorocyclopentadiene. Operation was continued for 11 hours. At the end of this period the octachlorocyclopentene content of the effluent had risen to 15.5 percent, the balance of the octachlorocyclopentene being completely converted to hexachlorocyclopentadiene which is close to the value of 16.5 percent found in glass as desired in Example 6. The run was stopped and the interior of the nickel pipe inspected. It was found to be coated with a carbonaceous deposit which acted as a coating for the catalytic surface. This example illustrates the catalytic action of the uncoated nickel surface which action is reduced by the carbonaceous coating which is due to impurities in the feed.

*Example 9*

A liquid mixture containing about equal weight percentages of hexachlorocyclopentadiene and octachlorocyclopentene was vaporized with about 12 volumes of hydrogen chloride gas per volume of organic vapor. The hydrogen chloride gas contained about 10 percent free chlorine gas and about 1.7 percent carbon dioxide. This gaseous mixture was introduced into a two inch nickel pipe 28 inches long containing 1544 cubic centimeters of free reactor space maintained at a temperature of about 500 degrees centigrade. The nominal retention time in the reactor was about 10 seconds. These conditions were maintained for a period of 5 hours. At the end of this period the effluent contained 2.1 mole percent octachlorocyclopentene the balance of the octachlorocyclopentene being completely converted to hexachlorocyclopentadiene. The reactor tube was dismantled and inspected. The inside walls of the tube were clean and free of any carbonaceous deposit.

*Example 10*

The conditions of Example 9 were repeated using hydrogen chloride gas containing about 2.0 percent air in place of the carbon dioxide. The run was continued for a period of 9 hours. At the end of this period the effluent contained 2.6 mole percent of octachlorocyclopentene the balance of the octachlorocyclopentene being completely converted to hexachlorocyclopentadiene. The reactor tube was dismantled and inspected. The inside wall of the tube were clean and free of any carbonaceous deposit.

The dechlorination temperature employed in our process is an important variable in two respects. First, the rate at which equilibrium conditions are approached is a function of the temperature, and our data for the operable temperature range, show that this rate is doubled for about each 25 centigrade degree increase in temperature. Second, the concentration of octachlorocyclopentene present at equilibrium is reduced as the temperature is increased. With no diluent gas present, the equilibrium mixture when using pure octachlorocyclopentene represents about 60 percent conversion to hexachlorocyclopentadiene at 400 degrees centigrade and 95 percent conversion at 500 degrees centigrade. The upper limit of temperature which can be satisfactorily employed for this reaction is about 550 degrees centigrade, at which temperature degradation of the hexachlorocyclopentadiene becomes significant.

The use of a diluent gas in this reaction is quite desirable, since the diluent materially increases the conversion to hexachlorocyclopentadiene attainable. Thus, using 12 volumes of diluent gas per mole of octachlorocyclopentene about 99.5 percent conversion at equilibrium is obtained at 500 degrees centigrade as compared to 95.0 percent with no diluent, and about 93 percent using 12 volumes of diluent gas per mole of octachlorocyclopentene at 400 degrees centigrade as compared to 60 percent with no diluent gas. Hydrogen chloride gas is the preferred diluent since it is produced in the chlorination of pentanes to octachlorocyclopentene, but any inert gaseous diluent such as nitrogen and the inert gases can also be used.

In feeding the octachlorocyclopentene to the reactor tube, a mixture which is liquid at room temperature is more readily handled than pure octachlorocyclopentene, which melts at 39 degrees centigrade. Any solvent stable at the reaction conditions can be used, but hexachlorocyclopentadiene is the preferred solvent, since no contamination of the product is obtained as when using such solvents as carbon tetrachloride. Other solvents such as perchloroethylene, hexachlorobutadiene, etc may be employed.

For efficient conversion of octachlorocyclopentene to hexachlorocyclopentadiene adequate catalytic surface must be provided. The reactor tube can be packed with catalyst to provide a large catalytic surface, but a clean reactor tube wall of nickel pipe is in itself quite effective. This surface should be kept free of deposits which reduce its activity. These deposits are mainly carbonaceous material formed by decomposition of organic impurities in the gas stream. Formation of these deposits can be avoided by introducing a small amount of some material which will react with carbon under the conditions used, such as carbon dioxide or oxygen or air. They could also be removed intermittently by shutting down the reactor and burning off the deposit. They could also be removed mechanically by scraping or brushing them from the tube walls.

Various inert materials can be used as catalyst carriers.

These materials should not be catalysts for the rechlorination of hexachlorocyclopentadiene to octachlorocyclopentene. Various materials such as pumice, alundum pellets and asbestos are satisfactory catalyst carriers. Nickel, cobalt, or alloys of the two metals can also be introduced in the form of turnings.

The commercial feed material for this reaction is normally obtained by chlorination of pentanes. One such process is described in our copending application S. N. 216,652, now Patent No. 2,714,124. The entire vapor discharge from the chlorinator of that process including all the hydrogen chloride may advantageously be employed. The products of such processes will usually contain small amounts of various hydrogen-containing compounds. These compounds are also eliminated when conducting the dechlorination as described herein, so that the resulting hexachlorocyclopentadiene is virtually free of such contaminants.

We claim:

1. The improvement in effecting the pyrolytic dechlorination of octachlorocyclopentene to hexachlorocyclopentadiene which comprises contacting the vapors of octachlorocyclopentene with a catalytic surface selected from the group consisting of nickel, cobalt, nickel chloride, cobalt chloride and mixtures thereof in a reaction zone maintained at a temperature between about 400 and about 550 degrees centigrade.
2. The process of claim 1 wherein the catalyst employed is nickel.
3. The process of claim 2 wherein the nickel catalyst is a component in the surface walls of the reaction zone.
4. The process of claim 2 wherein the reaction zone consists of a nickel tube.
5. The process of claim 1 wherein the catalyst employed is cobalt.
6. The process of claim 1 wherein the catalyst employed is nickel chloride.
7. The process of claim 1 wherein the catalyst employed is cobalt chloride.
8. The process of claim 1 wherein the catalyst employed is a mixture of metallic nickel and nickel chloride.
9. The process of claim 1 wherein the octachlorocyclopentene is diluted with a gaseous diluent substantially inert under the conditions of the reaction.
10. The process of claim 9 wherein the gaseous diluent is hydrogen chloride.
11. The process of claim 9 wherein the gaseous diluent is a mixture of hydrogen chloride and chlorine.
12. The process of claim 9 wherein the gaseous diluent is nitrogen.
13. The process of claim 9 wherein the octachlorocyclopentene is diluted with a gaseous mixture comprising crude hexachlorocyclopentadiene, hydrogen chloride and chlorine.
14. The process of claim 1 wherein the catalytic surface is reactivated by introducing carbon dioxide into the reaction zone.
15. The process of claim 1 wherein the catalytic surface is reactivated by introducing oxygen into the reaction zone.
16. The process of claim 1 wherein the catalytic surface is kept in an active condition by continuous introduction of carbon dioxide with the feed vapors.

References Cited in the file of this patent

UNITED STATES PATENTS

| | | |
|---|---|---|
| 2,509,160 | McBee et al. | May 23, 1950 |
| 2,631,171 | Newcomer | Mar. 10, 1953 |
| 2,650,942 | Maude et al. | Sept. 1, 1953 |